United States Patent
Fortune

(10) Patent No.: US 7,039,514 B2
(45) Date of Patent: May 2, 2006

(54) OCCUPANT CLASSIFICATION METHOD BASED ON SEATED WEIGHT MEASUREMENT

(75) Inventor: Duane D. Fortune, Lebanon, IN (US)

(73) Assignee: Delphi Technologies, Inc., Troy, MI (US)

( * ) Notice: Subject to any disclaimer, the term of this patent is extended or adjusted under 35 U.S.C. 154(b) by 205 days.

(21) Appl. No.: 10/797,407

(22) Filed: Mar. 10, 2004

(65) Prior Publication Data

US 2005/0203687 A1    Sep. 15, 2005

(51) Int. Cl.
*G08B 23/00* (2006.01)

(52) U.S. Cl. .............. 701/45; 701/46; 701/47; 701/49; 180/273; 340/667; 280/735

(58) Field of Classification Search ............ 701/45, 701/5, 46, 47, 49; 73/1.13; 180/271, 273, 180/258; 340/667; 280/735, 730.1
See application file for complete search history.

(56) References Cited

U.S. PATENT DOCUMENTS

| | | | |
|---|---|---|---|
| 6,578,871 B1 | 6/2003 | Gray et al. | 280/735 |
| 6,662,094 B1 | 12/2003 | Murphy et al. | 701/45 |
| 6,689,960 B1 * | 2/2004 | Aoki | 177/25.13 |
| 6,771,175 B1 * | 8/2004 | Eagle et al. | 340/573.1 |
| 2002/0024257 A1 | 2/2002 | Fujimoto et al. | 307/10.1 |
| 2003/0033065 A1 | 2/2003 | Vos et al. | 701/45 |
| 2003/0105570 A1 * | 6/2003 | Basir et al. | 701/45 |
| 2004/0016577 A1 | 1/2004 | Lichtinger et al. | 177/144 |
| 2004/0045758 A1 * | 3/2004 | Breed et al. | 180/271 |

FOREIGN PATENT DOCUMENTS

EP    0 721 863    7/1996

OTHER PUBLICATIONS

European Search Report dated Jul. 6, 2005.

* cited by examiner

*Primary Examiner*—Jack Keith
*Assistant Examiner*—Tuan C To
(74) *Attorney, Agent, or Firm*—Stefan V. Chmielewski

(57) ABSTRACT

An occupant of a motor vehicle seat is characterized for purposes of air bag suppression based on the seated weight of the occupant, the variation of the seated weight, and the occupant's apparent longitudinal center-of-mass. The method distinguishes between an adult and a child seat, distinguishes between forward-facing and rearward-facing child seats, and detects cinching of a child seat.

8 Claims, 5 Drawing Sheets

US 7,039,514 B2

OCCUPANT CLASSIFICATION METHOD BASED ON SEATED WEIGHT MEASUREMENT

TECHNICAL FIELD

This invention relates to a method of characterizing the occupant of a motor vehicle seat for purposes of allowing or suppressing air bag deployment based on sensed occupant seated weight, and more particularly to a method of detecting the presence of a child seat and cinching of the same with a seat belt or child seat anchor.

BACKGROUND OF THE INVENTION

Various systems and methods have been devised for characterizing the occupant of a motor vehicle seat for purposes of determining whether air bag deployment should be allowed or suppressed in the event of a crash. For example, deployment is generally allowed in the case of a normally seated adult occupant, and suppressed in the case of a child seat placed on the vehicle seat and cinched down with a seat belt or child seat anchor. The occupant can usually be accurately and reliably characterized by measuring the occupant's seated weight, either with a fluid-filled seat bladder or a set of seat frame tension sensors. However, the occupant status can be ambiguous in the case of a child seat because cinching increases the apparent weight of the occupant. For this reason, it has been proposed to utilize auxiliary sensors to measure parameters such as the seat belt tension, and to recognize and distinguish between forward-facing and rearward-facing infant seats. Since such auxiliary sensors significantly increase the cost and installation complexity of an occupant detection system, it would be more desirable to devise a method for accurately and reliably characterizing seat occupants, including child seats, without auxiliary sensors.

SUMMARY OF THE INVENTION

The present invention is directed to an improved method of characterizing the occupant of a vehicle seat based on seat weight responsive sensors from which the seated weight of the occupant and the occupant's apparent longitudinal (i.e., fore-aft) center-of-mass can be determined. According to this invention, the seated weight, the variation of the seated weight, and the apparent center-of-mass are used at system initialization to distinguish between adults and child seats, to distinguish between forward-facing and rearward-facing child seats, and to recognize cinching of a child seat.

BRIEF DESCRIPTION OF THE DRAWINGS

The present invention will now be described, by way of example, with reference to the accompanying drawings, in which.

DESCRIPTION OF THE PREFERRED EMBODIMENT

The present invention is disclosed in the context of a restraint system for an occupant of a vehicle passenger seat 10, where the occupant weight and apparent center-of-mass are detected based on the fluid pressures in the chambers of a multiple-chamber seat cushion bladder 12. However, the occupant weight and apparent center-of-mass can alternatively be detected using a different type of sensing system, such as a system that senses the strain in the frame 14 of seat 10, or a system that includes a network of pressure sensitive cells distributed over the seating area of seat 10.

Figure 1:
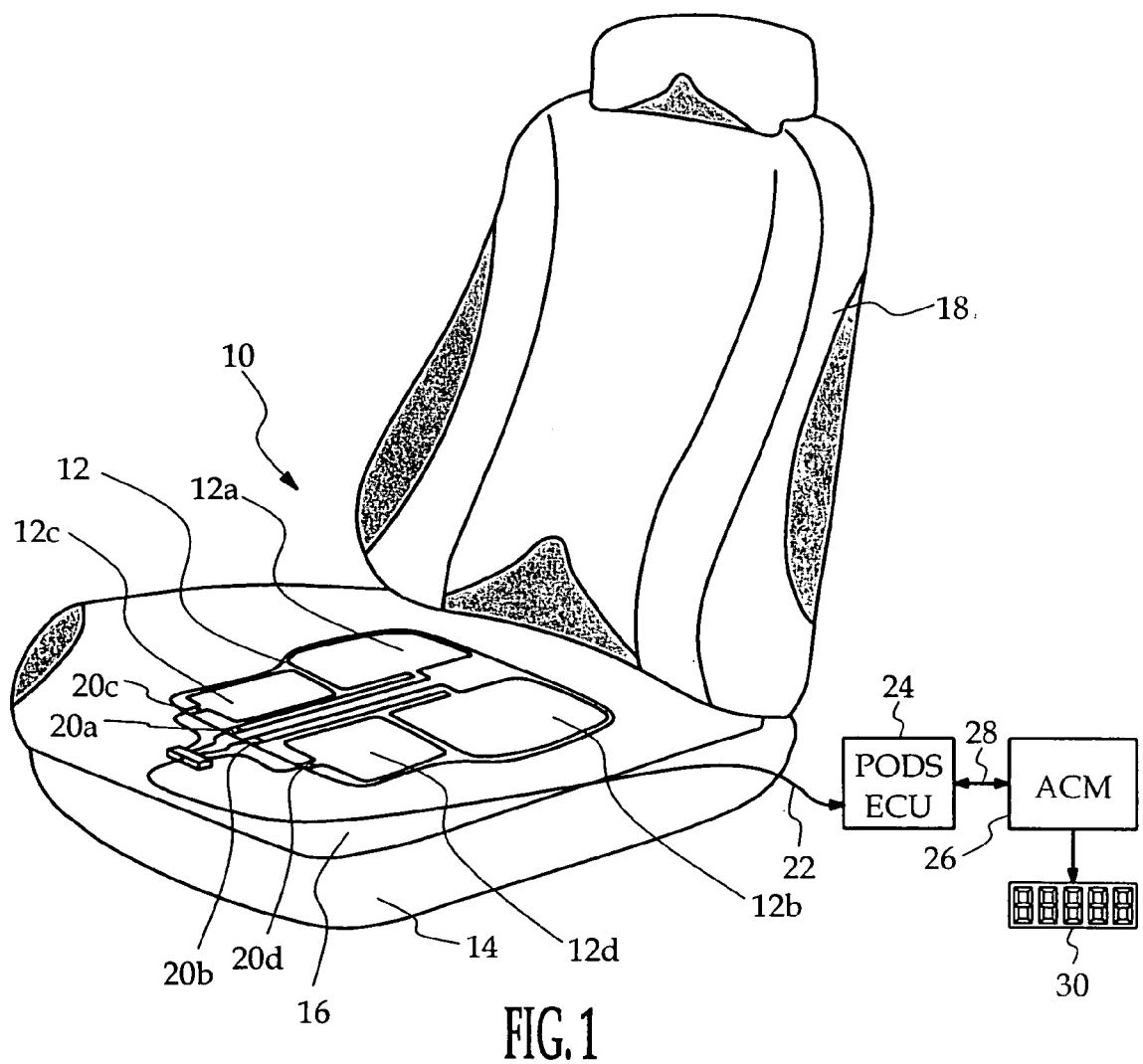
FIG. 1 is a system diagram illustrating a passenger seat of a vehicle equipped with a multiple chamber fluid-filled bladder, a passive occupant detection electronic control unit (PODS ECU), and an airbag control module (ACM).

Referring to FIG. 1, the vehicle seat 10 is supported on a frame 14, and includes foam cushions 16 and 18 on the seat bottom and back. Bladder 12 is disposed in or under foam cushion 16 substantially parallel with the central seating surface, and includes multiple physically isolated chambers—in the illustrated embodiment, the four chambers 12a, 12b, 12c and 12d. Each of the chambers 12a, 12b, 12c, 12d is filled with a fluid such as silicone, and each is coupled to a respective pressure sensor 20a, 20b, 20c, 20d responsive to the fluid pressure therein. The sum of the measured pressures provides a measure of the occupant's seated weight, and the magnitudes of the pressures in the forward chambers 12c, 12d relative to the magnitudes of the pressures in the rearward chambers 12a, 12b provide an indication of the occupant's apparent center-of-mass. Of course, similar information can be achieved with fewer or more chambers, or with a different type of sensing system such as a frame-based sensing system, and it will be understood that the present invention is not limited to the bladder-based system depicted in FIG. 1.

The electrical outputs of pressure sensors 20a–20d are provided as inputs via line 22 to a passive occupant detection system electronic control unit (PODS ECU) 24, which in turn, is coupled to an airbag control module (ACM) 26 via bi-directional communication bus 28. The ACM 26 may be conventional in nature, and operates to deploy one or more airbags or other restraint devices (not shown) for vehicle occupant protection based on measured vehicle deceleration and occupant characterization data obtained from PODS ECU 24. In general, ACM 26 deploys the restraints if the vehicle deceleration is indicative of a severe crash, unless the PODS ECU 24 indicates that deployment should be suppressed. Of course, other more sophisticated controls are also possible, such as controlling the deployment force of the restraint devices based on the occupant characterization data provided by PODS ECU 24. Also, ACM 26 optionally communicates the suppression status to a driver display device 30 to enable the driver to verify proper system operation.

According to the present invention, the PODS ECU 24 periodically samples the pressure sensor outputs on line 22 to determine the occupant's seated weight, the variation of the weight, and the occupant's apparent center-of-mass. The information is determined at least when the presence of an occupant is initially detected, and thereafter when the detected weight stabilizes unless it is clear that the occupant is an adult. When the detected weight indicates the presence of a child seat, the apparent center-of-mass is used to initially distinguish between forward-facing and rearward-facing orientations, and shifting in the apparent center-of-mass is used to detect cinching.

Figure 2:
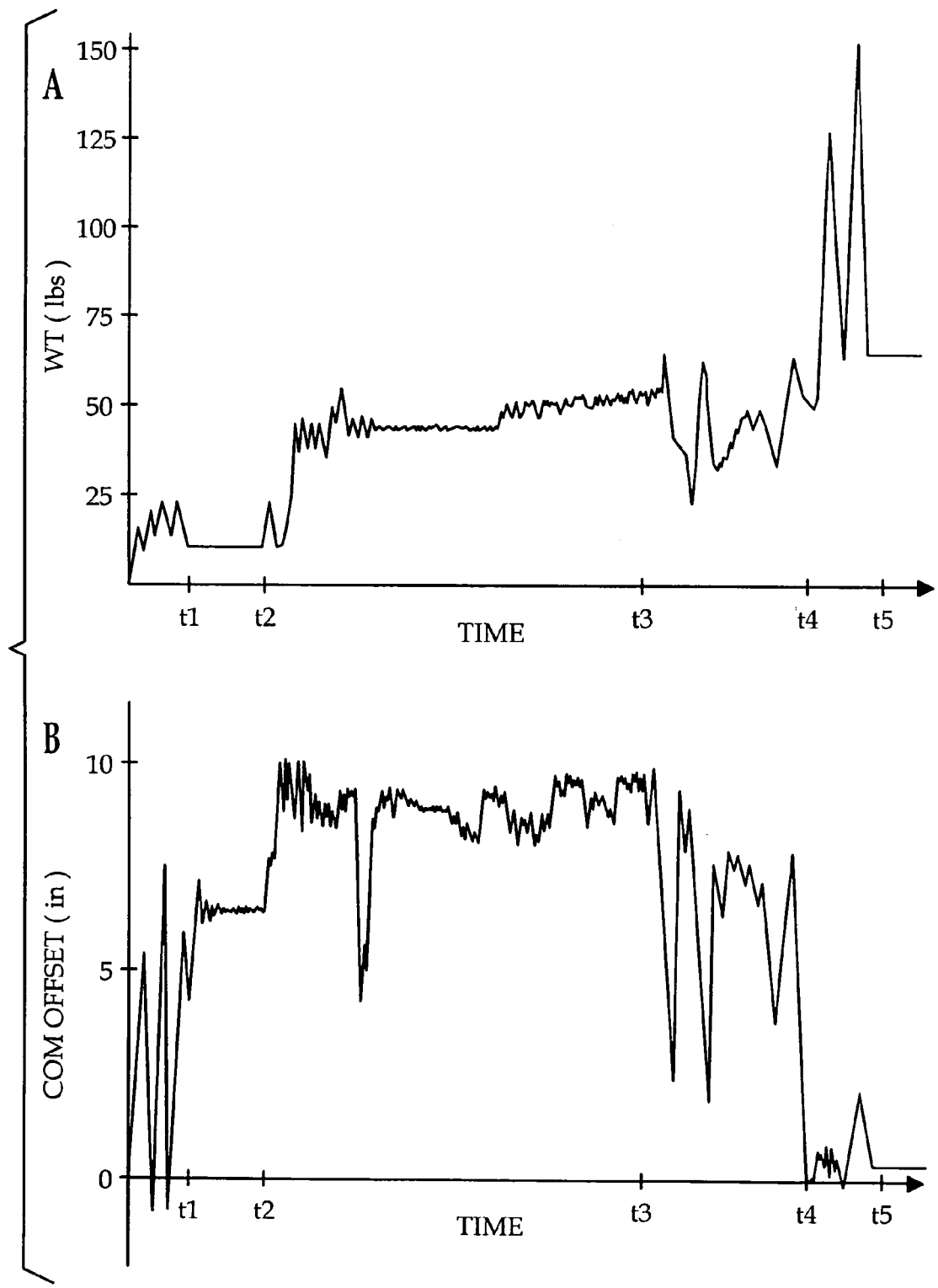
FIG. 2, Graphs A–B, respectively depict the occupant seated weight and longitudinal center-of-mass when the occupant is a rearward-facing child seat.

Graphs A and B of FIG. 2 respectively illustrate the seated weight (WT) and longitudinal center-of-mass (COM) measured when a rearward-facing child seat is placed on the seat 10 and then cinched down with a seat belt or child seat anchor. The seated weight WT is indicated in weight units (as opposed to pressure), and center-of-mass (COM) is depicted as an offset relative to an arbitrary zero point near the rear of the seat cushion 16. When the child seat is initially placed on the cushion 16, WT increases and then stabilizes at about 12 pounds in the interval t1–t2, while COM shifts forward by about 6.5 inches. The interval t1–t2 represents an initial period of weight measurement stability, and is followed by a period t2–t4 of weight measurement instability. The child seat is positioned for cinching in the interval t2–t3, and cinching occurs in the interval t3–t4. As seen in the graphs, cinching produces a significant increase in WT and a concurrent significant decrease in COM. Once the cinching process is completed at time t5, there is a secondary period of weight measurement stability in which WT remains at about 68 pounds and COM remains at about 0.5 inches. Thus, the significant increase in WT from the initial period t1–t2 of weight measurement stability to the secondary period of weight measurement stability following time t5, coupled with the concurrent significant rearward shifting of COM, indicates the occurrence of child seat cinching. Similar data is obtained in the case of a forward-facing child seat, except that the COM reading in the initial interval t1–t2 of weight stability is significantly lower than in the case of the rearward-facing child seat; this difference is detected according to this invention to reliably distinguish between forward-facing and rearward-facing child seats.

Figure 3A:
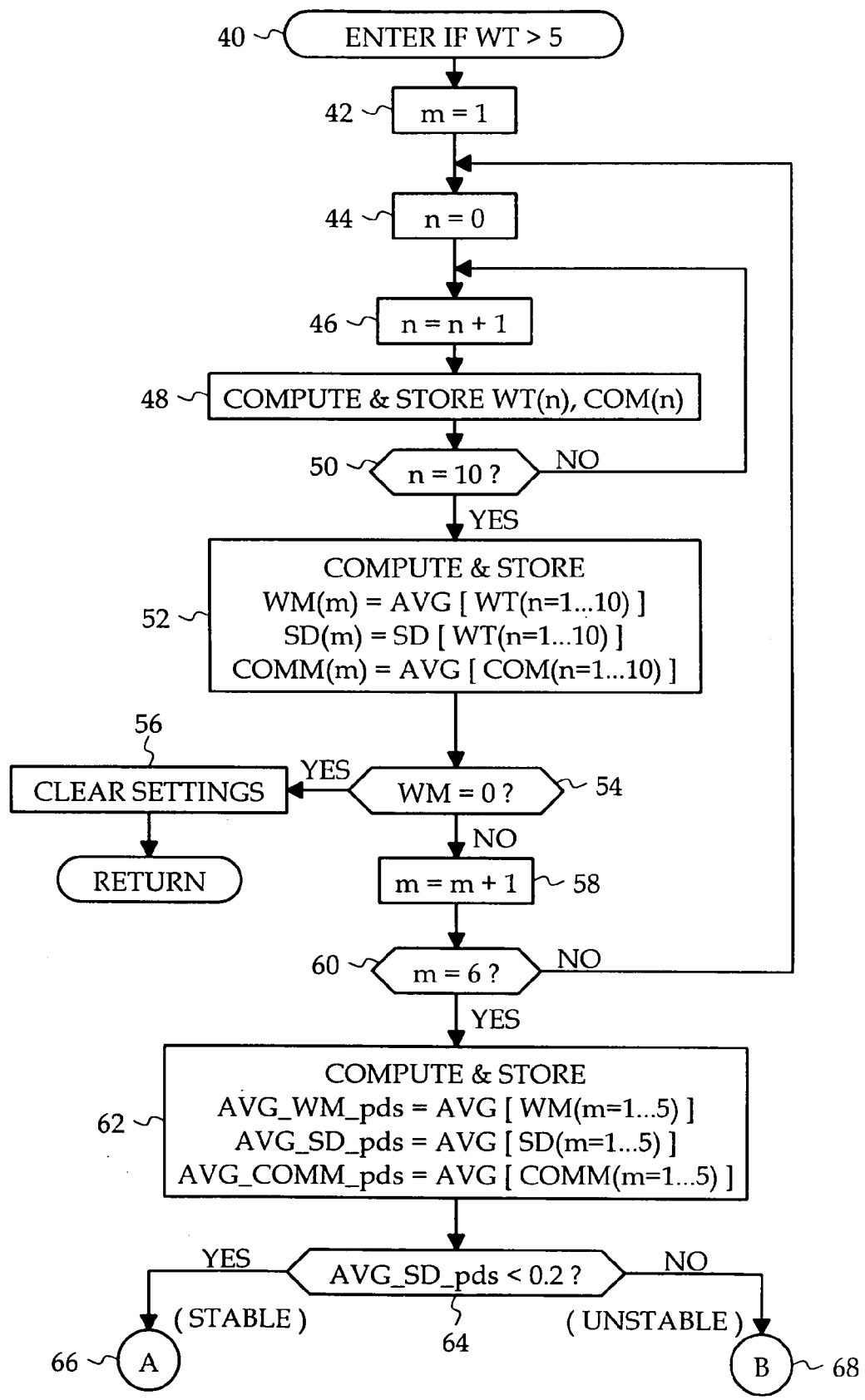
FIGS. 3A–3C together depict a software routine executed by the PODS ECU of FIG. 1 for carrying out the method of this invention.
Figure 3B:
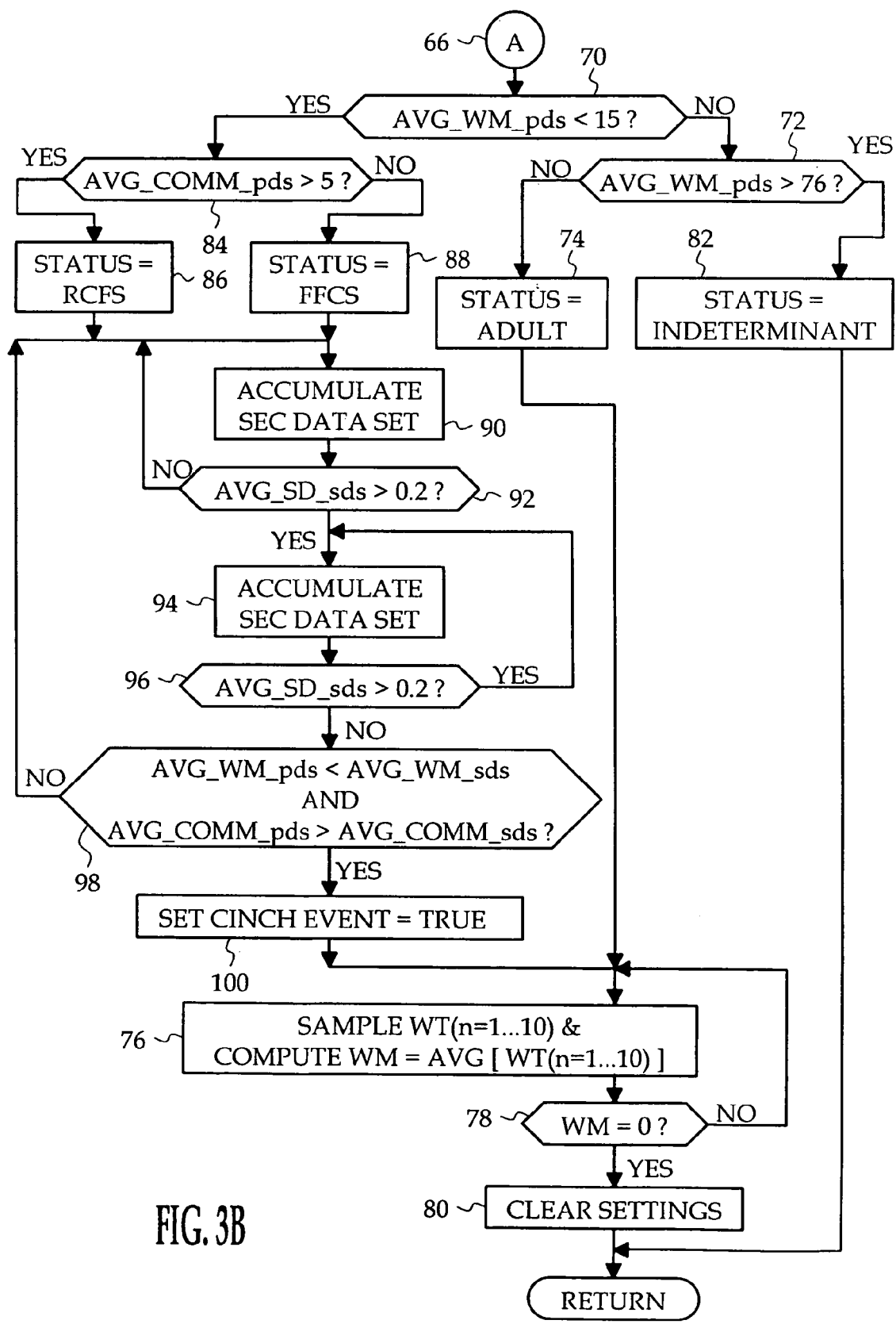
Figure 3C:
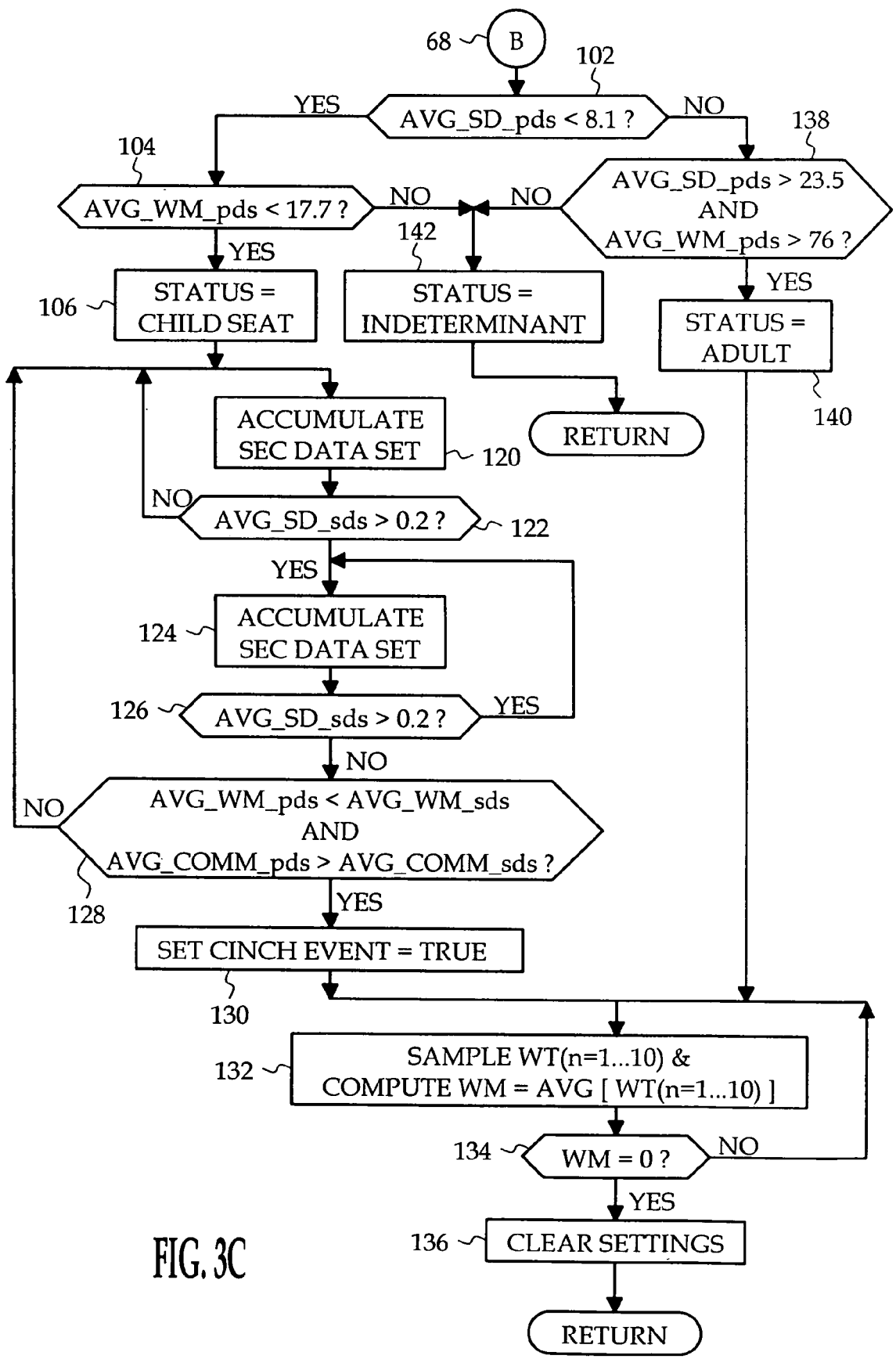

FIGS. 3A–3C set forth a flow diagram of a software routine executed by PODS ECU 24 in carrying out the method of this invention. Referring to FIG. 3A, execution of the routine commences when the seated weight WT exceeds an occupancy threshold such as 5 pounds, as indicated by the block 40. As will be seen below, the routine is exited (as designated by a RETURN block) whenever an averaged value of the weight WT returns substantially to zero, and the routine is re-entered when the occupancy threshold of block 40 is subsequently exceeded.

On entering the routine, the blocks 42–62 are executed to accumulate weight, weight variance and center-of-mass data based on numerous samples of the output signals of pressure sensors 20a–20d. The blocks 42 and 44 initialize a pair of loop counter variables m and n to one and zero, respectively. The blocks 46 and 48 then increment the loop counter variable n, sample the pressure signals, and compute and store corresponding values of seated weight WT and center-of-mass COM. The blocks 44–48 are re-executed until the loop counter variable n has been incremented to 10, as indicated by the block 50. At such point, PODS ECU 24 will have computed and stored ten successive values of WT, designated as WT(n=1 . . . 10), and ten successive values of COM, designated as COM(n=1 . . . 10). When block 50 is answered in the affirmative, the block 52 averages the ten successive values of WT to form a first weight measurement WM(1), computes a standard deviation (SD) of the ten successive values of WT to form SD(1), and averages the ten successive values of COM to form a first center-of-mass measurement COMM(1). If the weight measurement WM indicates that the seat 10 is empty, the blocks 54 and 56 clear the occupancy status settings and the routine is exited. Otherwise, the block 58 increments the loop counter variable m, and the block 60 checks to see if m has been incremented to six. As block 60 will initially be answered in the negative, the blocks 44–58 are re-executed to collect another ten successive WT and COM readings, and to compute and store a second weight measurement WM(2), a second standard deviation SD(2) and a second center-of-mass measurement COMM(2). By the time the block 60 is answered in the affirmative, PODS ECU 24 will have computed and stored five weight measurements, designated as WM(m=1 . . . 5), five standard deviations, designated as SD(m=1 . . . 5) and five center-of-mass measurements, designated as COMM(m=1 . . . 5). At such point, the block 62 is executed to compute and store a primary data set (pds) comprising the terms AVG_WM_pds, AVG_SD_pds and AVG_COMM_pds by respectively averaging WM(m=1 . . . 5), SD(m=1 . . . 5) and COMM(m=1 . . . 5).

Once the primary data set has been collected, the remainder of the routine is executed to characterize the occupant (if possible) and to monitor for cinching if the occupant is characterized as a child seat. First, the block 64 determines if the weight data is stable by comparing AVG_SD_pds to a reference value such as 0.2. If AVG_SD_pds<0.2, the weight data is considered to be stable, and the portion of the routine designated by the flow diagram of FIG. 3B is executed as indicated by the connector block 66; otherwise, the weight data is considered to be unstable, and the portion of the routine designated by the flow diagram of FIG. 3C is executed as indicated by the connector block 68.

Referring to FIG. 3B, the block 74 characterizes the occupant is as an adult (STATUS=ADULT) if blocks 70–72 determine that AVG_WM_pds exceeds an adult threshold such as 76 pounds. The blocks 76–78 then compute and monitor the seated weight to detect a return to zero; this is done by computing a weight measurement WM as described above in reference to blocks 44–52, and comparing WM to zero. As with the above-described blocks 54–56, the blocks 78–80 clear the occupancy status settings if WM returns to zero, whereafter the routine is exited. If AVG_WM_pds is less than 76 pounds, but greater than a child seat threshold such as 15 pounds, the block 82 sets STATUS to INDETERMINATE, and the routine is exited.

If block 70 determines that AVG_WM_pds is less than the child seat threshold of 15 pounds, the blocks 84–88 characterize the occupant as either a rearward-facing child seat (RFCS) or a forward-facing child seat (FFCS) depending on the primary data set center-of-mass term AVG_COMM_pds. If AVG_COMM_pds exceeds a threshold such as five inches, the block 86 sets STATUS to RFCS; otherwise, the block 88 sets STATUS to FFCS. In either event, the blocks 90–100 are then executed to monitor for cinching of the child seat. This is achieved by marking a first transition from stable to unstable weight measurement (blocks 90–92) followed by a second transition from unstable to stable weight measurement (blocks 94–96), and then checking for a concurrent increase in measured occupant weight and decrease (rearward shift) in measured center-of-mass (block 98). The blocks 90 and 94 acquire a secondary data set (sds) comprising the terms AVG_WM_sds, AVG_SD_sds and AVG_COMM_sds by executing a process corresponding to the blocks 42–62 of FIG. 3A. The block 90 repeats the secondary data accumulation process until the block 92 detects a transition to unstable weight measurement, as indicated by a value of AVG_SD_sds in excess of 0.2. Similarly, the block 94 repeats the secondary data accumulation process until the block 96 detects a transition to stable weight measurement, as indicated by a value of AVG_SD_sds of 0.2 or less. If block 98 does not detect cinching, the blocks 90–96 are re-executed until cinching is detected or the measured weight returns substantially to zero (as with blocks 54–56 of FIG. 3A). If cinching is detected at block 98, the block 100 is executed to set a CINCH EVENT flag to TRUE, and the blocks 76–80 are executed as described above to monitor the seated weight for an empty seat condition.

Referring to FIG. 3C, the blocks 102, 104 and 106 set the occupant STATUS to CHILD SEAT to indicate the presence of a generic child seat if AVG_SD_pds is less than a medium threshold such as 8.1 and AVG_WM_pds is less than a child seat threshold such as 17.7 pounds. Although the weight data under such conditions is too unstable to reliably distinguish between a rearward-facing child seat and a forward-facing child seat, the presence of a generic child seat (i.e., either a rearward-facing child seat or a forward-facing child seat) can nevertheless be reliably identified. After STATUS is set to CHILD SEAT at block 106, the blocks 120–136 are executed to monitor for cinching of the child seat or an empty seat condition. As with blocks 90 and 94 of FIG. 3B, the blocks 120 and 124 acquire a secondary data set (sds) comprising the terms AVG_WM_sds, AVG_SD_sds and AVG_COMM_sds by executing a process corresponding to the blocks 42–62 of FIG. 3A. In this case, however, block 122 will be immediately answered in the affirmative due to the relative instability of the weight data, and the accumulation of secondary data is repeated at block 124 until the block 126 detects a transition to stable weight measurement, as indicated by a value of AVG_SD_sds of 0.2 or less. Once the transition from unstable weight measurement to stable weight measurement is detected, the block 128 checks for cinching, as indicated by a concurrent increase in measured occupant weight and decrease (rearward shift) in measured center-of-mass, compared to the primary data set computed and stored at block 62. If block 128 does not detect cinching, the blocks 120–128 are re-executed until cinching is detected or the measured weight returns substantially to zero. If cinching is detected at block 128, the block 130 is executed to set the CINCH EVENT flag to TRUE, and the blocks 132–136 are executed to monitor the seated weight to detect an empty seat condition. If it is determined at block 138 that AVG_SD_pds exceeds a threshold such as 23.5 and AVG_WM_pds exceeds a threshold such as 76 pounds, the occupant is considered to be an adult, and block 140 sets occupancy STATUS to ADULT. As with the child seat characterization, the blocks 132–136 are then executed to monitor the seated weight to detect an empty seat condition. If blocks 104 or 138 are answered in the negative, the occupancy status cannot be reliably classified, and the block 142 is executed to set the occupant STATUS to INDETERMINATE; is this case, the routine is exited, and then re-entered at block 40, provided that the sensed weight WT still exceeds the occupancy threshold of five pounds.

In summary, the method of the present invention utilizes the seated weight of an occupant, the variation of the seated weight, and the apparent longitudinal center-of-mass of the occupant during system initialization to reliably distinguish between an adult and a child seat, to distinguish between forward-facing and rearward-facing child seats, and to recognize cinching of a child seat. While the method has been described in reference to the illustrated embodiment, it will be recognized that many of the threshold levels and computation techniques are presented by way of example, and are not intended to be limiting. Additionally, the method is applicable to systems incorporating different weight sensing mechanisms, such as seat frame-based sensing systems, and so on. Various other modifications will also occur to persons skilled in the art. Accordingly, it will be understood that methods incorporating these and other modifications may fall within the scope of this invention, which is defined by the appended claims.

The invention claimed is:

1. A method of classifying an occupant of a motor vehicle seat, comprising the steps of:
    measuring and sampling a seated weight of the occupant to form a primary data set including an average weight, an average standard deviation of said average weight and an average longitudinal center-of-mass of the occupant;
    monitoring said average standard deviation of said primary data set to detect an initial period of weight measurement stability;
    classifying the occupant as a forward-facing child seat if: (1) said initial period of weight measurement stability is detected, and (2) the average weight during said initial period does not exceed a child seat threshold, and (3) the average longitudinal center-of-mass during said initial period is rearward of a reference point; and
    classifying the occupant as a rearward-facing child seat if: (1) said initial period of weight measurement stability is detected, and (2) the average weight during said initial period does not exceed a child seat threshold, and (3) the average longitudinal center-of-mass during said initial period is forward of said reference point.

2. The method of claim 1, including the step of:
    once the occupant is classified as a forward-facing child seat or a rearward-facing child seat, repeatedly measuring and sampling the seated weight of the occupant to detect child seat cinching based on a concurrent increase in average weight and rearward shifting of the average longitudinal center-of-mass.

3. The method of claim 2, including the steps of:
    repeatedly determining secondary measures of said average weight, said average standard deviation and said average longitudinal center-of-mass;
    monitoring the secondary measures of average standard deviation to identify a transition from said initial period of weight measurement stability to a period of weight measurement instability, followed by a transition from said period of weight measurement instability to said secondary period of weight measurement stability; and
    detecting child seat cinching if (1) the average weight in said secondary period of weight measurement stability is greater than the average weight in said initial period of weight measurement stability and (2) the average longitudinal center-of-mass in said secondary period of weight measurement stability is rearward of the average longitudinal center-of-mass in said initial period of weight measurement stability.

4. The method of claim 1, including the step of:
    classifying the occupant as a generic child seat if (1) the average standard deviation is between first and second thresholds, and (2) the average weight does not exceed said child seat threshold by more than a reference amount.

5. The method of claim 4, including the step of:
  once the occupant is classified as a generic child seat, repeatedly measuring and sampling the seated weight of the occupant to detect child seat cinching based on a concurrent increase in average weight and rearward shifting of the average longitudinal center-of-mass.

6. The method of claim 5, including the steps of:
  repeatedly determining secondary measures of said average weight, said average standard deviation and said average longitudinal center-of-mass;
  monitoring the secondary measures of average standard deviation to detect a transition to a secondary period of weight measurement stability; and
  detecting child seat cinching if (1) said secondary measure of average weight is greater than the average weight of said primary data set, and (2) the secondary measure of average longitudinal center-of-mass is rearward of the average longitudinal center-of-mass of said primary data set.

7. The method of claim 1, including the step of:
  classifying the occupant as an adult if said average weight exceeds an adult weight threshold and said average standard deviation exceeds an adult standard deviation threshold.

8. The method of claim 1, including the step of:
  classifying the occupant as an adult if said initial period of weight measurement stability is detected and the average weight exceeds an adult weight threshold.

* * * * *